(12) United States Patent
de Wit et al.

(10) Patent No.: US 9,011,564 B2
(45) Date of Patent: Apr. 21, 2015

(54) UNIT FOR PUMPING AIR CONTAINING PARTICLES AND SEPARATING THE PARTICLES FROM THE AIR

(75) Inventors: Bastiaan Johannes de Wit, Nuis (NL); Fokke Roelof Voorhorst, Drachten (NL); Johannes Tseard Van Der Kooi, Hundegaryp (NL)

(73) Assignee: Koninklijke Philips N.V., Eindhoven (NL)

( * ) Notice: Subject to any disclaimer, the term of this patent is extended or adjusted under 35 U.S.C. 154(b) by 361 days.

(21) Appl. No.: 13/383,695

(22) PCT Filed: Jul. 16, 2010

(86) PCT No.: PCT/IB2010/053242
§ 371 (c)(1),
(2), (4) Date: Jan. 12, 2012

(87) PCT Pub. No.: WO2011/010253
PCT Pub. Date: Jan. 27, 2011

(65) Prior Publication Data
US 2012/0102901 A1    May 3, 2012

(30) Foreign Application Priority Data

Jul. 21, 2009   (EP) ..................... 09165951

(51) Int. Cl.
| | |
|---|---|
| B01D 45/14 | (2006.01) |
| A47L 9/18 | (2006.01) |
| A47L 5/22 | (2006.01) |
| A47L 9/16 | (2006.01) |
| A47L 9/22 | (2006.01) |
| B07B 7/083 | (2006.01) |

(52) U.S. Cl.
CPC . *A47L 9/188* (2013.01); *A47L 5/22* (2013.01); *A47L 9/1675* (2013.01); *A47L 9/22* (2013.01); *B01D 45/14* (2013.01); *B07B 7/083* (2013.01)

(58) Field of Classification Search
CPC ....................................................... B01D 45/00
USPC .................................. 55/406, 428, 437, 438
See application file for complete search history.

(56) References Cited

U.S. PATENT DOCUMENTS

| | | | |
|---|---|---|---|
| 2,228,750 A | 1/1941 | Brock | |
| 2,269,412 A | 1/1942 | Sturtevant | |
| 2,392,716 A | 1/1946 | Acheson | |
| 3,292,347 A | 12/1966 | Hodgkinson | |
| 4,640,697 A * | 2/1987 | Erickson, Jr. .................. | 96/333 |

(Continued)

FOREIGN PATENT DOCUMENTS

JP          8317887 A          12/1996

*Primary Examiner* — Duane Smith
*Assistant Examiner* — Sonji Turner

(57) ABSTRACT

A unit (2) for pumping air containing particles (5) and separating the particles (5) from the air comprises a housing (10) having a space (20) for receiving and storing the particles (5), and an air pumping device (30) being arranged inside the housing (10) and comprising a basic fan (31) intended for pumping air out of the particle storage space (20), and another fan (32) intended for separating the particles (5) from the air. A gap (22) is present between the fan arrangement of the air pumping device (30) and the housing (10), and in order to avoid a flow of air containing particles (5) through the gap (22), at least a major portion of the basic fan (31) is uncovered, so that a relatively strong pumping action on the basis of an interaction of an outer surface of the basic fan (31) with a stationary wall is avoided.

8 Claims, 2 Drawing Sheets

(56) References Cited

U.S. PATENT DOCUMENTS

| | | | |
|---|---|---|---|
| 4,693,734 A * | 9/1987 | Erickson, Jr. | 96/333 |
| 4,735,555 A * | 4/1988 | Erickson, Jr. | 417/244 |
| 4,824,333 A * | 4/1989 | Erickson, Jr. | 417/360 |
| 5,090,974 A * | 2/1992 | Kasper et al. | 95/218 |
| 5,096,475 A * | 3/1992 | Kasper et al. | 96/333 |
| 5,902,386 A | 5/1999 | Gustafson et al. | |
| 7,251,855 B2 * | 8/2007 | Hayashi et al. | 15/353 |
| 7,291,192 B1 * | 11/2007 | Lavasser et al. | 55/406 |
| RE41,212 E * | 4/2010 | Lavasser et al. | 55/406 |
| 2009/0085141 A1 | 4/2009 | Peizerat | |

* cited by examiner

UNIT FOR PUMPING AIR CONTAINING PARTICLES AND SEPARATING THE PARTICLES FROM THE AIR

FIELD OF THE INVENTION

The present invention relates to a unit for pumping air containing particles and separating the particles from the air, comprising:

a housing, comprising a space for receiving and storing the particles;

at least one opening in the housing for letting in the air containing particles to the particle storage space;

at least one opening in the housing for letting out the air; and an air pumping device that is arranged inside the housing, and that comprises two hollow fans arranged in series, which are rotated during operation of the unit, wherein one of the fans serves for pumping air out of the particle storage space, in a direction from the inlet opening to the outlet opening, and wherein another of the fans is arranged in a position for being counterproductive to the first, basic fan, and thereby being capable of separating the particles from the air, wherein the separator fan has less pumping power than the basic fan.

BACKGROUND OF THE INVENTION

A unit for pumping air containing particles and separating the particles from the air is suitable to be used in a number of appliances, including a vacuum cleaner.

In general, in the field of vacuum cleaning, air is used as a medium to pick up dirt in the form of small particles, and to transport the particles to a particle storage space. When the air containing particles reaches the particle storage space, or before that time, the air and the particles need to be separated, such that only the particles stay behind in the space. Traditionally, filter bags are used in the separation process. However, the use of filter bags has some major drawbacks, including the fact that the airflow through the filter bag decreases over time due to an increased resistance of the filter bag which is the logical result of the increased number of particles that is absorbed by the filter bag. Furthermore, filter bags are space consuming, and provide a place for micro organisms to grow on, which is unhygienic.

Another type of separation process involves an application of the so-called cyclone principle. According to this principle, the air containing particles is blown at high speed into the particle storage space, in a direction tangential to the wall of the space, so that a vortex is realized. The dirt particles are made to move to the wall of the space under the influence of centrifugal force, and clean air from the center of the vortex is expelled from the space.

Yet another type of separation process involves an application of a so-called active cyclone, which is basically a kind of centrifugal fan in series with a fan as normally used in a vacuum cleaner or the like. The cyclone fan, which will hereinafter be referred to as separator fan, is placed such that during operation, it is counterproductive to the normal fan, wherein it wants to pump air in the opposite direction. The normal fan is designed such as to be capable of pumping harder than the separator fan, so that it is achieved that the normal fan pumps air through the separator fan. In the process, the air enters the separator fan at the outer circumference, and exits the separator fan at the center. Hence, the air entering the separator fan is pumped against the centrifugal forces in this fan. On the basis of the fact that dirt particles have a much higher mass density than air, and the fact that the air does not have enough grip on the particles to drag them against the centrifugal field, it is achieved that the particles cannot pass the centrifugal field. In the process, the particles are separated from the air.

Advantages of an active cyclone are that a very robust construction may be realized, which can be very small compared to other constructions for performing the separation process. Furthermore, the active cyclone has the same advantages as the common cyclone. Among other things, the resistance remains constant during use, so that a decrease of suction power over time does not occur, and there is no dirt issue with water in case the vacuum cleaning is used in a wet cleaning process, as the construction is continually dried under influence of centrifugal effects.

U.S. Pat. No. 5,902,386 discloses a separator assembly for use in a vacuum cleaner, wherein the vacuum cleaner is a liquid bath vacuum cleaner, comprising a liquid bath for trapping dirt particles. The separator assembly includes a separator which is a dome-shaped element having a number of slots, and a disc-like plate. During operation of the vacuum cleaner, a fan assembly of a blower assembly and the separator are rapidly rotated about a central axis. The blower assembly creates a strong suction force to draw air entrained with dirt particles in the vacuum cleaner, and into contact with the liquid bath. Particles that are not trapped by the liquid bath are drawn by the blower assembly towards the separator.

The separator operates to separate the dirt particles from the ingested air by centrifugal force generated as a result of its rapid, axial rotation. The particle-free air is then drawn through the slots of the separator, and eventually exhausted back into the ambient environment.

The space where the separator is present is separated from the space where the fan assembly of the blower assembly is present by a wall, so that the space where particles are present is separated from the space where only clean air is present. However, a gap is present between the fan-separator assembly and the separation wall in order to allow for the necessary rotational motion of the fan-separator assembly. Hence, a dirt leaking problem is introduced. The disc-like plate of the separator assembly plays a role in solving this problem. In particular, as the plate rotates along with the separator, a counter airflow is generated, which helps to prevent water droplets and dirt particles from bypassing the separator and entering inside the space where the fan assembly of the blower assembly is present, through the gap between the fan-separator assembly and the separation wall.

SUMMARY OF THE INVENTION

Although using a disc-like plate with a separator as known from U.S. Pat. No. 5,902,386 may offer good results in preventing dirt leakage from a particle storage space to a space where only clean air is expected, there is a need for alternative solutions. It is an object of the present invention to provide such alternative solutions, i.e. solutions according to which the application of a disc-like plate for creating a counter airflow at the outside of the separator is omitted, and according to which dirt leakage is prevented on the basis of other measures.

According to a first aspect of the present invention, the object is achieved by a unit for pumping air containing particles and separating the particles from the air, comprising:

a housing, comprising a space for receiving and storing the particles;

at least one opening in the housing for letting in the air containing particles to the particle storage space;

at least one opening in the housing for letting out the air; and an air pumping device that is arranged inside the housing, and that comprises two hollow fans arranged in series, which are rotated during operation of the unit, wherein one of the fans serves for pumping air out of the particle storage space, in a direction from the inlet opening to the outlet opening, and wherein another of the fans is arranged in a position for being counterproductive to the first, basic fan, and thereby being capable of separating the particles from the air, wherein the separator fan has less pumping power than the basic fan;

wherein a gap is present between the fan arrangement of the air pumping device and the housing in order to allow for free rotation of the fans in the unit; and wherein at least a major portion of the basic fan is uncovered.

The solution according to the first aspect of the present invention is based on the insight that the basic fan has a secondary pumping function when a wall like a wall for separating the particle storage space and the space where only clean air is expected is arranged close to the fan. In general, a rotating disc close to a stationary wall causes air between the disc and the wall to rotate, thereby performing a secondary pumping function. As the basic fan is stronger than the separator fan, the secondary pumping function of the basic fan is stronger than a secondary pumping function of the separator fan. This fact contributes to the risk of having an airflow through the gap between the fan arrangement of the air pumping device and the housing, that is directed from the particle storage space to the space where only clean air is expected. The present invention eliminates this risk by ensuring that there is no wall in the vicinity of the basic fan, so that there is no secondary pumping effect of the basic fan. For example, according to the present invention, the basic fan is free from any wall of the housing, i.e. not covered by such a wall that may otherwise be present in the unit.

In the unit according to the present invention, there is still a gap between the fan arrangement of the air pumping device and the housing, wherein this gap is present at a position between the particle storage space on one side and a space where the basic fan lets out clean air on another side. However, due to the fact that the basic fan is only allowed to perform a primary pumping function, an airflow through the gap will be from the clean air space to the particle storage space, as the relatively strong basic fan creates an under pressure in the particle storage space, due to the fact that there is not a free inflow of air, but a resistance that is constituted by the inlet opening.

Besides the advantage of the prevention of dirt leakage, the unit according to the present invention has the advantage of ease of assembly. In a unit comprising a separation wall between the space where the basic fan is present and the space where the separator fan is present, assembly always needs to take place in at least two steps. In the unit of the present invention, only one step is needed, namely a single step in which the air pumping device is positioned in the housing.

In a practical embodiment of the unit according to the present invention, both the separator fan and a substantial portion of the basic fan are arranged inside the particle storage space. The basic fan may be shaped such as to taper in the direction towards the separator fan, and the gap between the fan arrangement of the air pumping device and the housing may be present near an air outlet side of the basic fan. In such a case, only the portion of the basic fan where clean air is let out is kept separated from the particle storage space. In respect of the gap between the fan arrangement of the air pumping device and the housing, it is noted that any suitable seal may be used. According to the present invention, dirt leakage through the gap is avoided, but it is still advantageous to seal the gap in order to minimize the leakage of clean air, so that the efficiency of the unit may be kept at an acceptable level.

Within the scope of the present invention, it is possible to have a design of the unit which is as simple as possible, wherein the housing may have a shape for only enclosing a single space in which the air pumping device is located without being intersected by a wall of the housing. By having a simple design, less material is used, and the manufacturing process of the unit may be simpler and cheaper.

According to a second aspect of the present invention, a unit for pumping air containing particles and separating the particles from the air is provided, which comprises the following components:

a housing, comprising a space for receiving and storing the particles;

at least one opening in the housing for letting in the air containing particles to the particle storage space;

at least one opening in the housing for letting out the air; and an air pumping device that is arranged inside the housing, and that comprises two hollow fans arranged in series, which are rotated during operation of the unit, wherein one of the fans serves for pumping air out of the particle storage space, in a direction from the inlet opening to the outlet opening, and wherein another of the fans is arranged in a position for being counterproductive to the first, basic fan, and thereby being capable of separating the particles from the air, wherein the separator fan has less pumping power than the basic fan;

wherein the housing comprises at least two portions separated by a wall, wherein the basic fan is accommodated inside one of the portions, which has the opening for letting out the air, and wherein the separator fan is accommodated inside another of the portions, which constitutes the space for receiving and storing the particles, and which has the opening for letting in the air;

wherein a gap is present between the fan arrangement of the air pumping device and the separation wall in order to allow for free rotation of the fans in the unit; and wherein at least one opening is arranged in the housing for letting in air to the space where the basic fan is accommodated.

In this type of unit, the housing comprises at least two portions, wherein a wall is present for separating the portions. On the basis of the presence of the wall, the basic fan acts as a secondary pump, and this fact contributes to the risk of having an airflow through the gap between the fan arrangement of the air pumping device and the separation wall that is directed from the particle storage space to the space where only clean air is expected, in a similar manner as has been explained in the foregoing. The present invention eliminates this risk by bypassing the secondary pump constituted by the basic fan.

In the unit according to the present invention, the secondary pump of the basic fan is fed by air flowing into the unit, particularly the space where the basic fan is accommodated, from outside of the housing. Hence, it is achieved that an inflow spot of the secondary pump is no longer inside the particle storage space, but inside the space where the basic fan is accommodated, which is the space where clean air is expected. On the basis of this fact, the secondary pump is used for pumping clean air instead of air containing particles, and the pumping action of the secondary pump of the basic fan on the air containing particles, i.e. the air that is present inside the particle storage space, is eliminated. In that case, an airflow through the gap between the fan arrangement of the air pumping device and the separation wall will be from the clean air space to the particle storage space, wherein the direction of the airflow is determined by the fact that an under pressure is prevailing inside the particle storage space, as has been explained in the foregoing.

In a practical embodiment of the unit according to the present invention, an additional wall is provided inside the space where the basic fan is arranged for hindering a direct flow of air from the opening for letting in air to the opening for letting out air. In this way, the air cannot escape from the space where the basic fan is accommodated without flowing through the secondary pump of the basic fan first, so that it is ensured that the secondary pump of the basic fan is fed with fresh air, and the desired elimination of the secondary pump may actually be achieved.

Within the concept of having an additional wall as mentioned, it may be so that at least a portion of the additional wall is extending at a close distance with respect to the basic fan, wherein a gap is present between an inner end of the additional wall, i.e. an end of the additional wall that is closest to a central axis of the basic fan, and the basic fan. The position of the additional gap as mentioned is determined by the design of the additional wall, and may be chosen such that a considerable portion of the basic fan is used in the pumping process of the fresh air. Furthermore, it is possible to have a circumferential pressure prevailing at the additional gap. When measures are taken to ensure that a flow resistance between the additional gap and the gap that is present between the fan arrangement of the air pumping device and the separation wall is higher than a flow resistance between the additional gap and the opening for letting air to the space where the basic fan is accommodated, it is possible for the additional gap to realize a flow of fresh air from this opening towards the gap and through the gap, wherein a situation in which the additional gap and the gap that is present between the fan arrangement of the air pumping device and the separation wall influence each other in the process of realizing the air flow is avoided. This is a practical way of guaranteeing the desired effects of the basic fan pumping clean air, and an airflow through the gap between the fan arrangement of the air pumping device and the separation wall being directed from the clean air space to the particle storage space. In general, in order for the construction having the additional gap at the end of the additional wall to function in an optimal manner, it is advantageous to take measures aimed at realizing that it is easier for air to flow from the opening for letting in air to the additional gap than from the particle storage space to the additional gap, through the gap that is present between the fan arrangement of the air pumping device and the separation wall.

It follows from the foregoing that the present invention provides alternative solutions to having a disc-like plate that is associated with the separator fan, wherein the plate in fact serves for increasing the effect of the secondary pump of the separator fan by providing a larger surface for rotating air. According to the present invention, the solutions are found at the side of the basic fan rather than the side of the separator fan, wherein measures may be taken which are aimed at preventing the secondary pump from taking in air containing particles from the particle storage space, or which are aimed at removing the secondary pump of the basic fan, as is the case with the above-described examples. In any case, when the present invention is applied, leakage of dirt through a passage from the particle storage space to the clean air space, which is present at the position of a gap between the fan arrangement of the air pumping device and the housing, does not occur, while there is no need for applying a disc-like plate such as the plate known from U.S. Pat. No. 5,902,386.

The above-described and other aspects of the present invention will be apparent from and elucidated with reference to the following detailed description of two embodiments of a vacuum cleaning unit according to the present invention, preceded by a detailed description of a vacuum cleaning unit according to the state of the art.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
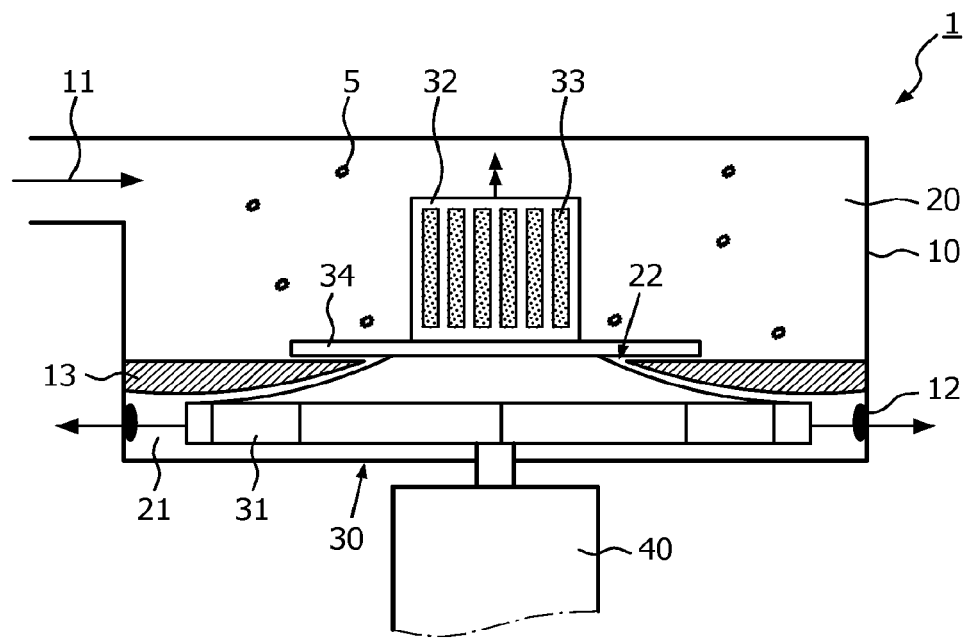
FIG. 1 diagrammatically shows a sectional view of a vacuum cleaning unit according to the state of the art.

FIG. 1 shows a vacuum cleaning unit 1 according to the state of the art. The vacuum cleaning unit 1 comprises a housing 10 including a space 20 for storing dirt particles. In the figures, for sake of illustration, a number of particles are shown and indicated by means of reference numeral 5. For sake of completeness, it is noted that in the context of this text, the term "dirt particles" is used to indicate any type of particle that is intended to be sucked in by the vacuum cleaning unit 1, including dust particles. It is also noted that the particles to be sucked in by the vacuum cleaning unit 1 may also be water droplets, for example, wherein the water is collected in the space 20 as mentioned. For the purpose of letting in air containing particles 5, at least one inlet opening 11 is arranged in the housing 10, and for the purpose of letting out clean air, at least one outlet opening 12 is arranged in the housing 10. Both a flow of air containing particles 5 through the inlet opening 11 and a flow of clean air through the outlet opening 12 are indicated by an arrow in the figures.

The vacuum cleaning unit 1 comprises an air pumping device 30 and a motor 40 or other suitable means for driving the air pumping device 30 such as to rotate about a central axis. In the figures, the rotational movement is diagrammatically indicated by means of a double-headed arrow. The air pumping device 30 is arranged inside the housing 10, and comprises two hollow fans 31, 32, namely a first, basic fan 31 for creating an under pressure and thereby realizing air suction in a way that is well-known in the field of vacuum cleaning, and a second fan 32 for separating dirt particles 5 from sucked-in air.

In particular, the separator fan 32 is arranged such as to be counterproductive to the basic fan 31. Furthermore, the basic fan 31 is designed such as to pump harder than the separator fan 32 when the fans 31, 32 are rotated. As a consequence, during operation, air enters the separator fan 32 at the outer circumference, through slits 33, or other suitable openings, arranged in the fan 32, and exits the separator fan 32 at the center. Subsequently, the air enters the basic fan 31 at the center, and exits the basic fan 32 at the outer circumference. However, it is not possible for the particles 5 carried by the sucked-in air to follow the same route through the vacuum cleaning unit 1, as the first part of the route is against the centrifugal forces in the separator fan 32. Water and dirt have a much higher mass density than air, wherein the mass density may even be 700 times higher, and the air has too little grip on water droplets and dirt particles 5 to drag them against the centrifugal field, starting from a certain size of the droplets and particles. This means that at the position of the separator fan 32, particles 5 cannot pass the centrifugal field, and are filtered out of the air.

The housing 10 has a wall 13 for separating the particle storage space 20 from another space 21 of the housing 10, which is the space 21 where the basic fan 31 is arranged, and which is the space 21 where only clean air is expected. By means of this separation wall 13, a free flow of dirt particles 5 from the dirt storage space 20 to the other space 21 is prevented, so that the risk of contamination of the air in the clean air space 21 is minimized. However, there is a gap 22 between the fan arrangement of the air pumping device 30 and the separation wall 13, so that the fans 31, 32 are capable of rotating freely about the central axis. As this gap 22 is also a gap between the particle storage space 20 and the clean air space 21, a dirt leaking problem is introduced.

Actual dirt leakage takes place when there is an airflow from the particle storage space 20 to the clean air space 21. Such an airflow is not present on the basis of a primary pumping function of the air pumping device 30. In particular, when the fans 31, 32 are rotated, the primary fan 31 performs a pumping function, and the separator pump 32 pumps a little in the opposite direction. As the basic fan 31 is stronger than the separator fan 32, a flow through the gap 22 and/or a pressure difference over the gap 22 is realized. Due to the dominant pumping action of the basic fan 31, and the fact that the particle storage space 20 has only one or more relatively small inlet openings 11, an under pressure is obtained in the particle storage space 20, and clean air is passed on from the clean air space 21 to the particle storage space 20, flowing from the high pressure side from the low pressure side, through the gap 22. It is clear that such an air flow does not compromise the process of separating particles 5 and air; as such an air flow does not involve a displacement of particles 5 from the particle storage space 20 to the clean air space 21.

Besides the primary pumping function of the air pumping device 30 as described in the foregoing, there is also a secondary pumping function, which is obtained where a surface of a fan rotates close to a stationary surface. In the vacuum cleaning unit 1, the basic fan 31 creates a relatively strong secondary pump, due to the fact that surfaces of the basic fan 31 and the separation wall 13 are extending closely to each other. At the position of the separator fan 32, there is hardly any surface to cooperate with, so that the secondary pumping action of the separator fan 32 is relatively weak. Hence, there would be dirt leakage through the gap 22 on the basis of the secondary pumping action of the basic fan 31, in case no further measures would be taken. However, a solution is found in providing a disc 34 and associating this disc 34 with the separator fan 32, wherein this disc 34 is arranged on the air pumping device 30 and is positioned such as to be located between the separator fan 32 and the separation wall 13. On the basis of the presence of the disc 34, the secondary pumping action of the separator fan 32 is increased, wherein the increase may be to such an extent that the secondary pumping action of the basic fan 31 is outweighed or even exceeded. As soon as that is the case, there is no longer a risk that a polluting airflow from the particle storage space 20 to the clean air space 21 is obtained.

Summarizing, when the vacuum cleaning unit 1 is operated and the fans 31, 32 are rotated, air containing particles 5 is sucked in the housing 10 through the inlet opening(s) 11, and received in the particle storage space 20. On the basis of the pumping action of the basic fan 31, the air is sucked further into the housing 10. In the process, the air enters the air pumping device 30 through the slits 33 in the separator fan 32, and flows through the air pumping device 30 to the clean air space 21. However, the particles 5 cannot move against the centrifugal field of the separator fan 32, and stay behind in the particle storage space 20. In this way, the air and the particles 5 are separated, and clean air is blown out of the housing 10 through the outlet opening(s) 12.

Dirt leakage from the particle storage space 20 to the clean air space 21 cannot occur on the basis of the presence of a separation wall 13 between these spaces 20, 21. At the position where a gap 22 is present between the fan arrangement of the air pumping device 30 and the separation wall 13, dirt leakage is prevented on the basis of the presence of a disc 34 that serves for enhancing a secondary pumping action of the air pumping device 30 at the side of the particle storage space 20.

Figure 2:
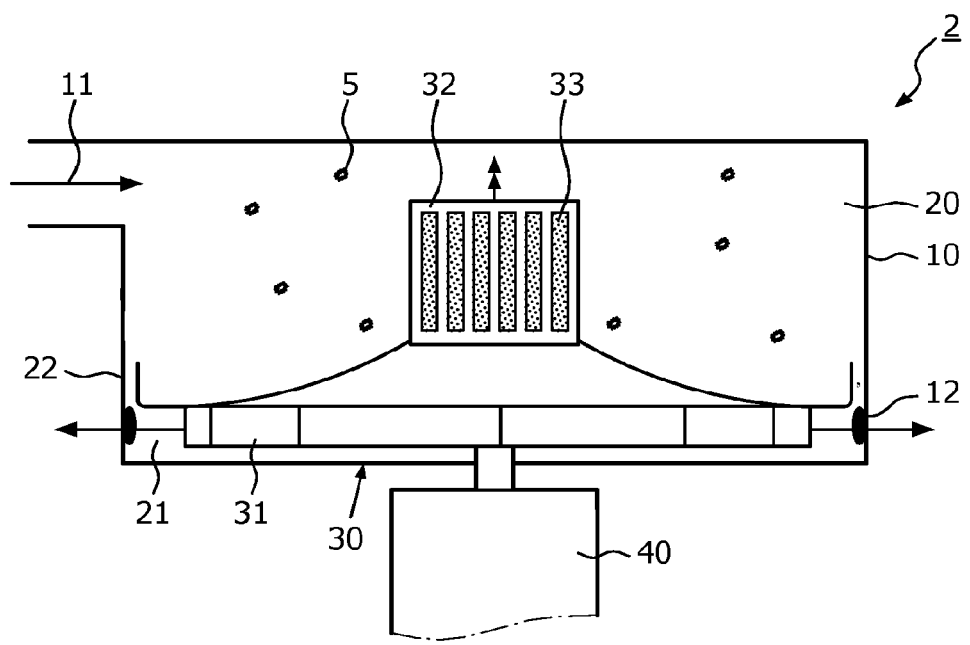
FIG. 2 diagrammatically shows a sectional view of a vacuum cleaning unit according to a first embodiment of the present invention.
Figure 3:
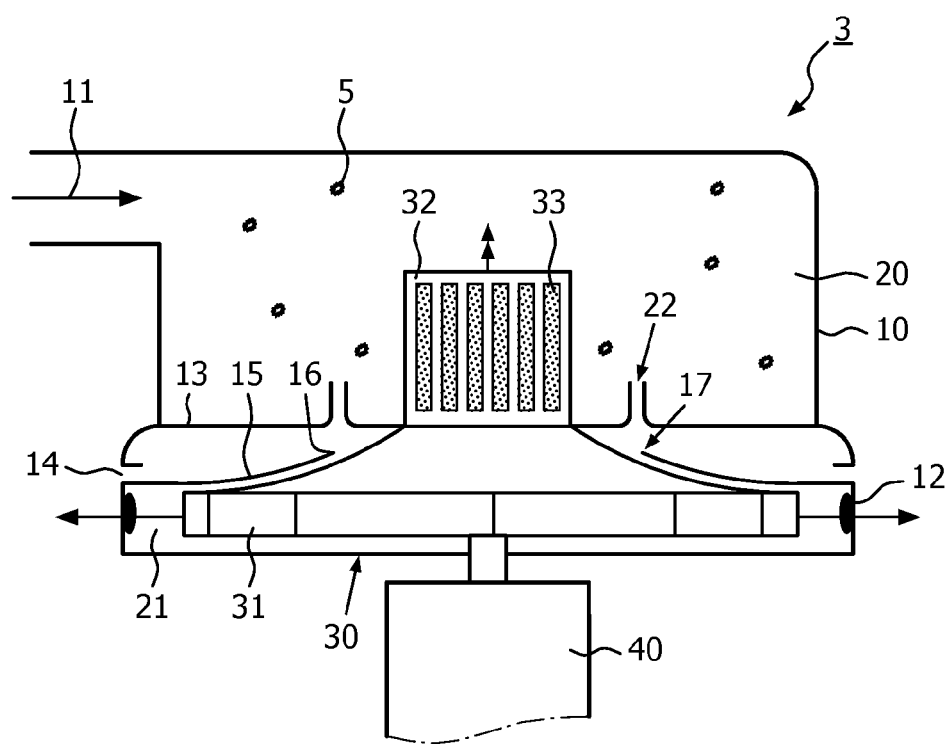
FIG. 3 diagrammatically shows a sectional view of a vacuum cleaning unit according to a second embodiment of the present invention.

FIGS. 2 and 3 show two embodiments of a vacuum cleaning unit according to the present invention. As is the case with the vacuum cleaning unit 1 according to the state of the art, measures are taken to avoid dirt leakage from the particle storage space 20 to the clean air space 21. However, these measures do not involve the application of a disc 34 at the side of the particle storage space 20 for enhancing the secondary pumping action of the air pumping device 30 at that side. Instead, the present invention proposes other measures for solving the dirt leakage problems caused by the relatively strong secondary pumping action of the basic fan 31.

In general, the vacuum cleaning units according to the present invention resemble the vacuum cleaning unit 1 according to the state of the art to a large extent. In particular, these vacuum cleaning units also comprise a housing 10 having at least one inlet opening 11 and at least one outlet opening 12, a particle storage space 20 and a clean air space 21, an air pumping device 30 comprising a basic fan 31 and a separator fan 32, and at least one motor 40 or the like for driving the fans 31, 32. As has been mentioned before, the disc 34 is omitted in the vacuum cleaning units according to the present invention.

When the first embodiment of the vacuum cleaning unit according to the present invention, which is shown in FIG. 2 and indicated by reference numeral 2, is compared to the vacuum cleaning unit 1 according to the state of the art, it is found that the vacuum cleaning unit 2 according to the present invention does not comprise a separation wall 13 having a surface extending closely to the basic fan 31. In this way, it is achieved that the basic fan 31 is not capable of performing a secondary pumping action.

In the vacuum cleaning unit 2 according to the present invention, a gap 22 between the fan arrangement of the air pumping device 30 and the housing 10 is present near the air outlet side of the basic fan 31. During operation, when the fans 31, 32 are rotated, air containing particles 5 is sucked in the housing 10 through the inlet opening(s) 11, and is made to flow from one side of the housing 10 to another side, wherein the air flows through the air pumping device 30. The particles 5 stay behind on the basis of the functioning of the separator fan 32. The clean air exits the housing 10 through the outlet opening(s) 12.

In particular, in the vacuum cleaning unit 2 according to the present invention, particles 5 cannot pass through the gap 22 that is present between the fan arrangement of the air pumping device 30 and the housing 10. The reason is that there is no secondary pumping action effect which might cause an airflow from the particle storage space 20 to the clean air space 21 through the gap 22. If air passes through the gap 22, it flows in the other direction under the influence of the under pressure prevailing in the particle storage space 20 due to the relatively strong primary pumping action of the basic fan 31. Hence, if air passes through the gap 22, it is clean air flowing from the clean air space 21 to the particle storage space 20.

Not only does this embodiment of the vacuum cleaning unit 2 according to the present invention function well, this embodiment offers also a considerable advantage as far as its assembling process is concerned. In the vacuum cleaning unit 1 according to the state of the art, the separation wall 13 needs to be positioned between two rotating components, namely the disc 34 and the basic fan 31 at an inlet side, i.e. the side where the separator fan 32 and the disc 34 are present. Therefore, there need to be at least two steps in the assembling process of the vacuum cleaning unit 1 according to the state of the art. However, in the vacuum cleaning unit 2 according to the present invention, the air pumping device 30 may be put in place in the housing 10 in one step. Thus, time and costs are saved during the assembling process, as well as material which would otherwise be needed for forming the separation wall 13.

In order to enhance the effect of keeping the particles 5 at only one side of the gap 22 that is present between the fan arrangement of the air pumping device 30 and the housing 10, it is advantageous if the well-known principle of a labyrinth seal is applied at the position of the gap 22. In such a case, an element that is present at the outer circumference of the fan arrangement of the air pumping device 30 and an element projecting from the housing 10 are shaped such as to constitute two elements of the labyrinth seal, and to realize a curved intermediate path for the air to follow.

When the second embodiment of the vacuum cleaning unit according to the present invention, which is shown in FIG. 3 and indicated by reference numeral 3, is compared to the vacuum cleaning unit 1 according to the state of the art, it is found that the vacuum cleaning unit 3 according to the present invention is equipped with at least one inlet opening 14 in the clean air space 21 and a wall 15 for forming a barrier between the inlet opening(s) 14 and the outlet opening(s) 12. The inlet opening(s) 14 serve for letting in clean air to the clean air space 21, and the barrier wall 15 extends at a small distance with respect to the outer surface of the basic fan 31, so that it is capable of guiding the clean air from the inlet opening(s) 14 towards its free end 16, and from that point on along the outer surface of the basic fan 31 towards the outlet opening(s) 12. In this way, it is achieved that the basic fan 31 is not capable of performing a secondary pumping action on air containing particles 5 through a gap 22 that is present between the fan arrangement of the air pumping device 30 and a separation wall 13 of the housing 10.

During operation of the vacuum cleaning unit 3 according to the present invention, when the fans 31, 32 are rotated, air containing particles 5 is sucked in the housing 10 through the inlet opening(s) 11, and is made to flow from one side of the housing 10 to another side, wherein the air flows through the air pumping device 30. The particles 5 stay behind on the basis of the functioning of the separator fan 32. The clean air exits the housing 10 through the outlet opening(s) 12.

Furthermore, clean air is sucked in the clean air space 21 through the inlet opening(s) 14, and the clean air flows towards the free end 16 of the barrier wall 15. An inflow spot for the secondary pump constituted by the basic fan 31 is at this point rather than in the particle storage space 20. Hence, clean air is pumped from the inlet opening(s) 14 to the free end 16 of the barrier wall 15, and exits at the outlet opening(s) 12. In order to achieve this effect in practice, it is advantageous if the size of the inlet opening(s) 14 is sufficient for realizing a circumferential pressure at the free end 16 of the barrier wall 15.

In particular, in the vacuum cleaning unit 3 according to the present invention, particles 5 cannot pass through the gap 22 that is present between the fan arrangement of the air pumping device 30 and the separation wall 13. The reason is that there is an under pressure at the side of the particle storage space 20, whereas there is a circumferential pressure at the side of the clean air space 21. Thus, if air passes through the gap 22, it flows in the other direction under the influence of the pressure difference over the gap 22. Hence, if air passes through the gap 22, it is clean air flowing from the clean air space 21 to the particle storage space 20.

For a proper functioning of the vacuum cleaning unit 3 according to the present invention, it is advantageous if a flow resistance between the gap 22 and a gap 17 that is present at the free end 16 of the barrier wall 15 is higher than a flow resistance between each one of the gaps 17, 22 and the inlet opening(s) 14, so that it is achieved that each one of the gaps 17, 22 sucks air from a space that is present between the separation wall 13 and the barrier wall 15 without influencing each other in that process. One practical way of realizing the relation of the flow resistances as mentioned is having a relatively large dimension of the inlet opening(s) 14 in order to realize a relatively low resistance, having a relatively low resistance from the inlet opening(s) 14 to the gaps 17, 22, and having the gaps 17, 22 arranged at some distance with respect to each other.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

It is noted that in the air pumping device 30, the pumps 31, 32 may be connected to each other, as is the case in the shown examples, but that this is not necessary within the scope of the present invention. Especially in the second embodiment of the vacuum cleaning unit 3 according to the present invention, it is also possible for the pumps 31, 32 to be separately arranged, wherein it may even be so that different motors are provided for driving the pumps 31, 32. Furthermore, it is noted that the air pumping assembly may comprise more pumps than the two pumps 31, 32 as mentioned with the examples. In particular, in a practical embodiment of the unit 2, 3 according to the present invention, the air pumping device 30 may comprise three pumps, but that does not alter the fact that an even higher number of pumps is possible as well.

The present invention can be summarized as follows. A unit 2, 3 for pumping air containing particles 5 and separating the particles 5 from the air, comprises a housing 10 having a space 20 for receiving and storing the particles 5, at least one opening 11 in the housing 10 for letting in the air containing particles 5 to the particle storage space 20, and at least one opening 12 in the housing 10 for letting out the air. Furthermore, the unit 2, 3 comprises an air pumping device 30 that is arranged inside the housing 10, and that comprises two hollow fans 31, 32 arranged in series, which are rotated during operation of the unit 2, 3, wherein one of the fans 31, 32, which is referred to as basic fan 31, serves for pumping air out of the particle storage space 20, and wherein another of the fans 31, 32 is capable of separating the particles 5 from the air. A gap 22 is present between the fan arrangement of the air pumping device 30 and the housing 10 in order to allow for free rotation of the fans 31, 32 in the unit 2, 3.

According to one aspect of the present invention, in order to avoid a flow of air containing particles 5 through the gap 22, at least a major portion of the basic fan 31 is uncovered, so that a relatively strong pumping action on the basis of an interaction of an outer surface of the basic fan 31 with a stationary wall, which may cause the undesirable airflow as mentioned, is avoided. Another solution for avoiding the undesirable airflow involves having an additional flow of clean air in a clean air space 21 of the housing 10, and guiding the flow of clean air along a considerable portion of an outside surface of the basic fan 31.

The invention claimed is:

1. A unit for pumping air containing particles and separating the particles from the air, comprising:
   a housing, comprising a particle storage space receiving and storing the particles;
   at least one inlet opening in the housing letting in the air containing particles to the particle storage space;
   at least one outlet opening in the housing letting out the air; and
   an air pumping device arranged inside the housing, said air pump device comprising:
      a fan assembly comprising:
         two hollow fans arranged in series, which are rotated during operation of the unit, wherein a first one of the two fans serves for pumping air out of the particle storage space, in a direction from the inlet opening to the outlet opening, and a second one of the two fans is arranged in a position for being counterproductive to the first one of the two fans, thereby being capable of separating the particles from the air, wherein the second one of the two fans having less pumping power than the first one of the two fans,
      wherein a gap is present between the fan arrangement of the air pumping device and the housing, said gap directing air to flow to said particle storage space.

2. The unit according to claim 1, wherein the second of the two fans and a portion of the first one of the two fans are arranged inside the particle storage space.

3. The unit according to claim 1, wherein the housing has a shape for enclosing a single space in which the air pumping device is located without being intersected by a wall of the housing.

4. The unit according to claim 1, wherein a labyrinth seal is realized at a position of the gap.

5. A unit for pumping air containing particles and separating the particles from the air, said unit comprising:
   a housing, comprising a particle storage space receiving and storing the particles;
   at least one inlet opening in the housing letting in the air containing particles-to the particle storage space;
   at least one outlet opening in the housing letting out the air; and
   an air pumping device arranged inside the housing, comprising:
      a fan arrangement, said fan arrangement comprising:
         two hollow fans arranged in series, which are rotated during operation of the unit, wherein a first one of the fans serves for pumping air out of the particle storage space, in a direction from the inlet opening to the outlet opening, and wherein a second one of the fans is arranged in a position for being counterproductive to the first fan, and capable of separating the particles from the air, wherein the second fan has less pumping power than the first fan; the housing further comprises:
      at least two spaces separated by a wall, wherein the first fan is accommodated inside one of the at least two spaces, said space including the opening letting out the air, and wherein the second fan is accommodated inside another of the at least one spaces, which constitutes the particle storage space, wherein a gap is present between the fan arrangement and the separation wall, said gap directing air to flow from said space containing said first fan to said particle storage space; and
   at least one opening arranged in the housing letting in air to the space where the first fan is accommodated.

6. The unit according to claim 5, wherein an additional wall is provided inside the space where the first fan is arranged for hindering a direct flow of air from the opening for letting in air to the opening for letting out air.

7. The unit according to claim 6, wherein at least a portion of the additional wall is extending at a close distance with respect to the first fan, wherein a second gap is present between an inner end of the additional wall and the first fan, and wherein a flow resistance between the second gap and the gap that is present between the fan arrangement of the air pumping device and the separation wall is higher than a flow resistance between the second gap and the opening for letting air to the space where the first fan is accommodated.

8. A unit for pumping air containing particles and separating the particles from the air, comprising:
   a housing, comprising a particle storage space for receiving and storing the particles;
   an inlet opening in the housing letting in the air containing particles to the particle storage space;
   an outlet opening in the housing letting out the air; and
   an air pumping device that is arranged inside the housing, said air pump device comprising:
      a fan assembly comprising:
         two hollow fans arranged in series that are rotated during operation of the unit, wherein a first one of the two fans serves for pumping air out of the particle storage space in a direction from the inlet opening to the outlet opening, and
         a second one of the two fans is arranged in a position for being counterproductive to the first one of the two fans thereby being capable of separating the particles from the air, wherein the second one of the two fans having less pumping power than the first one of the two fans, wherein a labyrinth seal is realized at a position of a gap formed between the fan arrangement of the air pumping device and the housing.

* * * * *